United States Patent
Lafon et al.

(10) Patent No.: US 10,745,147 B2
(45) Date of Patent: Aug. 18, 2020

(54) DETACHABLE CARGO MIRROR

(71) Applicant: Bell Helicopter Textron Inc., Fort Worth, TX (US)

(72) Inventors: Brian Lafon, Johnson City, TN (US); Ricky Jenkins, Bluff City, TN (US); Sean Morgan, Kingsport, TN (US); William P. Sumner, Kingsport, TN (US); William L. Neal, Abingdon, VA (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 752 days.

(21) Appl. No.: 15/349,571

(22) Filed: Nov. 11, 2016

(65) Prior Publication Data

US 2018/0134411 A1 May 17, 2018

(51) Int. Cl.
*B64D 47/00* (2006.01)
*B64D 9/00* (2006.01)

(52) U.S. Cl.
CPC ............ *B64D 47/00* (2013.01); *B64D 9/00* (2013.01)

(58) Field of Classification Search
CPC ........ B64D 47/00; B64D 9/00; B60R 1/0605; B60R 1/078; B60R 1/02; B60R 1/06; Y10S 248/90
See application file for complete search history.

(56) References Cited

U.S. PATENT DOCUMENTS

| | | | | | |
|---|---|---|---|---|---|
| 2,262,606 | A | * | 11/1941 | Hardman | B64D 37/04 244/123.12 |
| 2,596,632 | A | * | 5/1952 | Whitehead | B60R 1/078 248/279.1 |
| 3,081,057 | A | * | 3/1963 | Farnsworth | B60R 1/078 248/484 |
| 3,142,469 | A | * | 7/1964 | Clemmer | B60R 1/078 248/487 |
| 3,168,277 | A | * | 2/1965 | Stewart | B60R 1/078 248/479 |
| 4,030,692 | A | * | 6/1977 | Szilagyi | B60R 1/06 248/487 |
| 4,368,868 | A | * | 1/1983 | Urban | B60R 1/0605 248/475.1 |

(Continued)

OTHER PUBLICATIONS

Airbus Helicopters; H130 Dual External Cargo Mirrors; https://www.airbushelicopters.ca/optional-eguipment/cargo-mirror/; Oct. 26, 2016.

*Primary Examiner* — Medhat Badawi
(74) *Attorney, Agent, or Firm* — Timmer Law Group, PLLC

(57) ABSTRACT

A detachable cargo mirror assembly for use on a rotorcraft surface that includes a bracket configured to mount to a surface on the rotorcraft, the bracket comprising a base portion and a retainer portion having a first pair of opposing holes, an elongated arm having two opposing ends, a first end for coupling with the bracket and a second end coupled to a mirror apparatus, the first end having a passage: and a releasable connector configured to engage with the first pair of opposing holes and the passage in the elongated arm when the elongated arm is in a first position to display a desired image on the mirror apparatus. The detachable cargo mirror assembly can be removed or in a stowed position when not in use.

7 Claims, 6 Drawing Sheets

(56) References Cited

U.S. PATENT DOCUMENTS

| | | | | |
|---|---|---|---|---|
| 4,500,063 A * | 2/1985 | Schmidt | B60R 1/06 | 248/314 |
| 4,512,634 A * | 4/1985 | Stout | B60R 1/0605 | 359/872 |
| 4,815,836 A * | 3/1989 | Byers | B60R 1/078 | 248/475.1 |
| 4,951,913 A * | 8/1990 | Quesada | B60D 1/36 | 248/485 |
| 5,015,083 A * | 5/1991 | Wurst | B64D 47/00 | 359/630 |
| 5,025,543 A * | 6/1991 | Byers | B60R 1/078 | 248/480 |
| 5,106,049 A * | 4/1992 | Schmidt | B60R 1/002 | 248/487 |
| 5,116,013 A * | 5/1992 | Malcolmson | B60R 1/0605 | 248/484 |
| 5,433,417 A * | 7/1995 | Schmidt | B60R 1/002 | 248/316.5 |
| 5,850,991 A * | 12/1998 | Hainsworth | B64D 1/22 | 244/137.1 |
| 5,864,438 A * | 1/1999 | Pace | B60R 1/078 | 359/841 |
| 5,931,440 A * | 8/1999 | Miller | B60R 1/04 | 248/549 |
| 6,361,178 B1 * | 3/2002 | Lang | B60R 1/0617 | 359/872 |
| 6,394,616 B1 * | 5/2002 | Foote | B60R 1/074 | 248/480 |
| 6,877,868 B2 * | 4/2005 | Olijnyk | B60R 1/078 | 248/479 |
| 6,883,923 B2 * | 4/2005 | Englander | B60R 1/082 | 359/838 |
| 6,962,420 B2 * | 11/2005 | Branham | B60R 1/0617 | 248/481 |
| 7,140,740 B1 * | 11/2006 | Cooper | B60R 1/0602 | 359/509 |
| 7,216,885 B1 * | 5/2007 | Stopka | B60D 1/36 | 248/477 |
| 7,252,398 B2 * | 8/2007 | Englander | B60R 1/0605 | 248/479 |
| 7,654,488 B2 * | 2/2010 | Obst | B64C 1/1407 | 244/129.4 |
| 8,517,331 B2 * | 8/2013 | Roberts | B60R 1/06 | 248/475.1 |
| 8,991,770 B2 * | 3/2015 | Bandera | B64C 13/06 | 244/221 |
| 9,057,833 B2 * | 6/2015 | Bowers | B60R 1/06 | |
| 9,079,537 B2 * | 7/2015 | Niessen | B60R 1/06 | |
| 9,150,156 B2 * | 10/2015 | Bowers | B60R 1/0607 | |
| 9,211,840 B1 * | 12/2015 | Englander | B60R 1/0605 | |
| 9,457,916 B2 * | 10/2016 | McDermott | B64F 1/18 | |
| 2003/0103282 A1 * | 6/2003 | Schmidt | B60R 1/0605 | 359/872 |
| 2008/0180822 A1 * | 7/2008 | Henion | B60R 1/002 | 359/876 |
| 2010/0226026 A1 * | 9/2010 | Englander | B60R 1/0605 | 359/841 |
| 2012/0133112 A1 * | 5/2012 | Myrant | B62B 1/208 | 280/655 |
| 2012/0286094 A1 * | 11/2012 | Petsche | B64D 1/22 | 244/131 |
| 2015/0239547 A1 * | 8/2015 | Sumner | B64C 1/1492 | 244/129.3 |
| 2015/0259011 A1 * | 9/2015 | Deckard | B62D 21/183 | 280/781 |

* cited by examiner

DETACHABLE CARGO MIRROR

BACKGROUND

Technical Field

The following description relates to a detachable cargo mirror, and more particularly, to a detachable cargo mirror for a rotorcraft.

Description of Related Art

Rotorcraft include helicopters, tilt wing aircraft, and other vertical lift aircraft that have rotary wings. Rotorcraft can be equipped with an external cargo hook that allows for an external load to be suspended below the rotorcraft in flight, which can be engaged and disengaged remotely from the cockpit controls. Various types of cargo mirrors have been used in the past by the pilot to see the cargo hook and load during the engagement and disengagement procedure.

Typically, a mirror is permanently installed to the fuselage, which causes unnecessary air drag during flight when not in use.

Another method involves a mirror permanently mounted to the rotorcraft but stowable by means of a pull cable routed through the nose of the aircraft that the pilot can utilize.

There is a need for an improved detachable cargo mirror assembly for an aircraft that can be used on an aircraft when transporting cargo and stowed when not in use.

SUMMARY

In a first aspect, there is provided a detachable cargo mirror assembly for use on a rotorcraft surface, including a bracket configured to mount to a surface on the rotorcraft, an elongated arm, and a releasable connector. The bracket includes a base portion and a retainer portion having a first pair of opposing holes. The elongated arm has two opposing ends, a first end for coupling with the bracket and a second end coupled to a mirror apparatus, the first end having a passage. The releasable connector is configured to engage with the first pair of opposing holes and the passage in the elongated arm when the elongated arm is in a first position to display a desired image on the mirror apparatus.

In one embodiment, the surface on the rotorcraft is lateral of the nose.

In another embodiment, the surface is a side surface.

In yet another embodiment, the surface is a landing gear surface.

In an embodiment, the bracket is fixedly connected to the surface when the elongated arm is not in a first position.

In another embodiment, the elongated arm is rigidly curved sufficient to view the lower surface of the rotor craft.

In one embodiment, the mirror apparatus is coupled to the second end via a pivot mount.

In an embodiment, the mirror apparatus is an electronic display device.

An embodiment provides that the releasable connector is a detent pin.

In one embodiment, the releasable connector is a locking pin.

In yet another embodiment, the retainer portion further includes a second pair of opposing holes for engagement with the releasable connector when the elongated arm is in a second position for stowage.

In a second aspect, there is provided a detachable cargo mirror assembly for use on a rotorcraft surface, including a kit. The kit includes a bracket configured to mount to a surface on the rotorcraft, the bracket comprising a base portion and a retainer portion having a first pair of opposing holes; an elongated arm having two opposing ends, a first end for coupling with the bracket and a second end coupled to a mirror apparatus, the first end having a passage; and a releasable connector configured to engage with the first pair of opposing holes and the passage in the elongated arm when the elongated arm is in a first position to display a desired image on the mirror apparatus.

In a third aspect, there is provided a rotorcraft including a fuselage with a surface, a bracket configured to mount to the surface, the bracket comprising a base portion and a retainer portion having a first pair of opposing holes, an elongated arm having two opposing ends, a first end for coupling with the bracket and a second end coupled to a mirror apparatus, the first end having a passage; and a releasable connector configured to engage with the first pair of opposing holes and the passage in the elongated arm when the elongated arm is in a first position to display a desired image on the mirror apparatus.

An embodiment, provides a locking method for the detachable cargo mirror assembly, including the following steps: engaging the first end of the elongated arm in the retainer portion of the bracket, aligning the first pair of opposing holes with the passage in the elongated arm, engaging the releasable connector in the first pair of opposing holes and the passage in the first end of the elongated arm, and maintaining the locked configuration by use of a protrusion proximate one of the first pair of opposing holes, wherein the protrusion extends beyond the diameter of one of the first pair of opposing holes.

Another embodiment provides an unlocking method for the detachable cargo mirror, including the following steps: releasing the protrusion such that it does not extend beyond the diameter of one of the first, pair of opposing holes, disengaging the releasable connector from the first pair of opposing holes and the passage in the first end of the elongated arm, and disengaging the first end of the elongated arm in the retainer portion of the bracket.

One embodiment provides a locking method that includes engaging the first end of the elongated arm in the retainer portion of the bracket, aligning the second pair of opposing holes with the passage in the elongated arm, engaging the releasable connector in the second pair of opposing holes and the passage in the first end of the elongated arm, and maintaining the locked configuration by use of a protrusion proximate one of the second pair of opposing holes, wherein the protrusion extends beyond the diameter of one of the second pair of opposing holes.

In another embodiment, there is provided an unlocking method for the detachable cargo mirror including the steps of: releasing the protrusion such that it does not extend beyond the diameter of one of the second pair of opposing holes, disengaging the releasable connector from the second pair of opposing holes and the passage in the first end of the elongated arm, and disengaging the first end of the elongated arm in the retainer portion of the bracket.

Other aspects, features, and advantages will become apparent from the following detailed description when taken in conjunction with the accompanying drawings, which are a part of this disclosure and which illustrate by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The embodiments of the detachable mirror will be described with reference to a helicopter 100, it will be appreciated that the detachable cargo mirror mechanical may be used on any type of aircraft in which it is desirable to have a detachable mirror for viewing the exterior of the aircraft; for example, and not limitation, helicopters, tilt wing aircraft, other vertical lift aircraft that have rotary wings, and aircraft that can transport cargo on an exterior surface.

Figure 1:
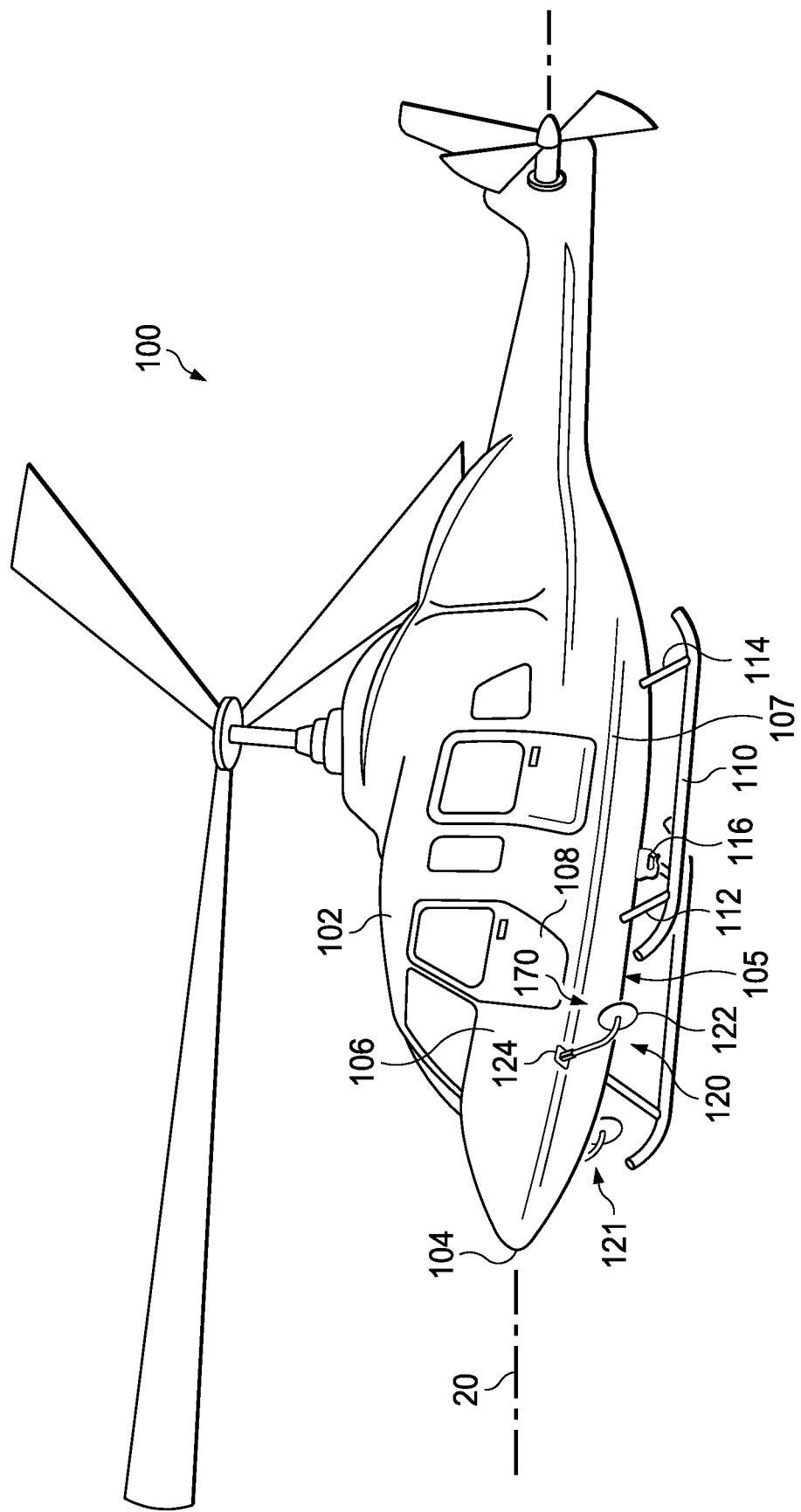
FIG. 1 is a perspective view of a rotorcraft showing the detachable cargo mirror assembly in a first locked position, according to one example embodiment.
Figure 2:
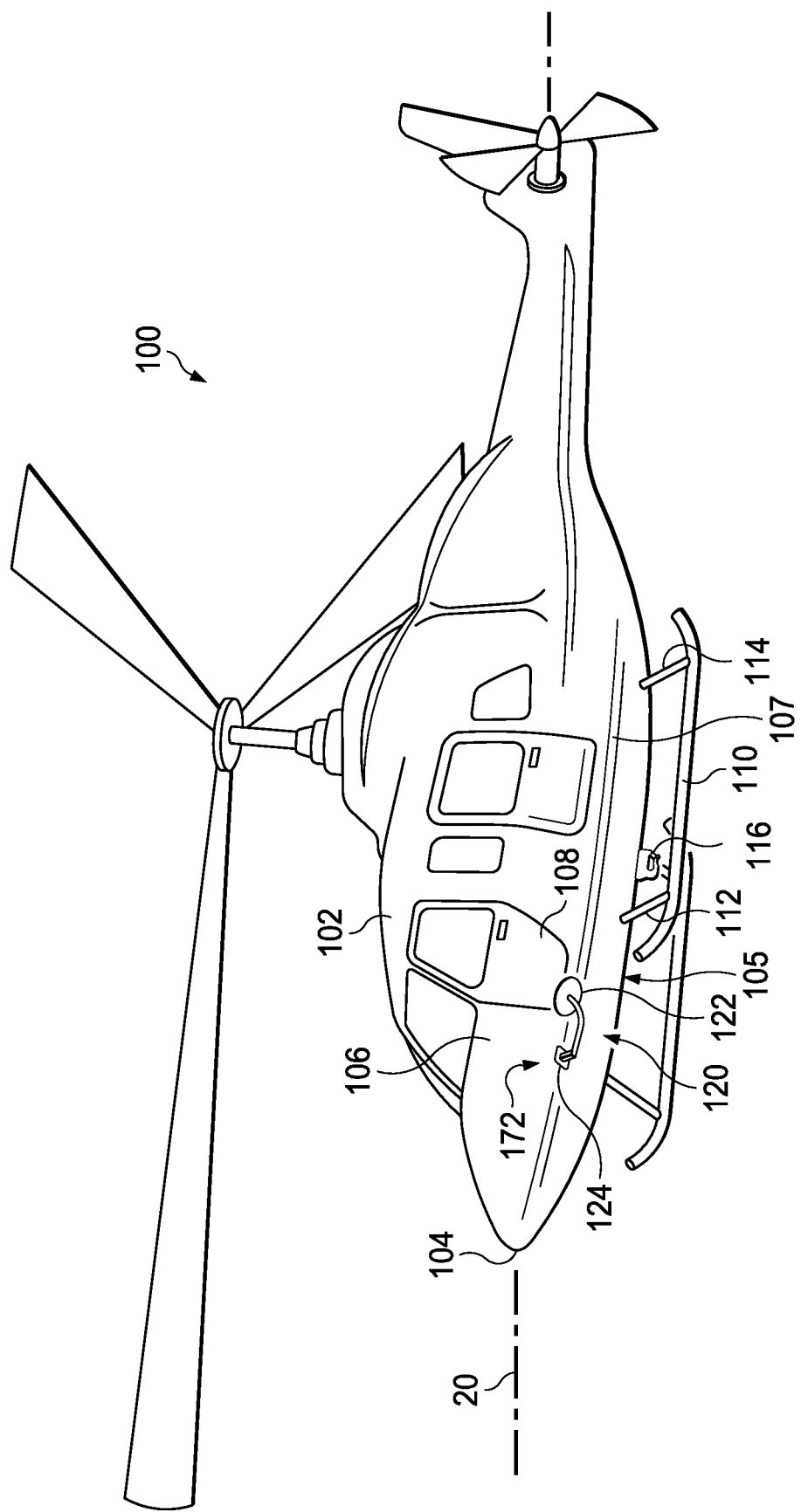
FIG. 2 is a perspective view of the aircraft in FIG. 1 showing the detachable cargo mirror assembly in a second stowed position, according to one example embodiment.
Figure 3:
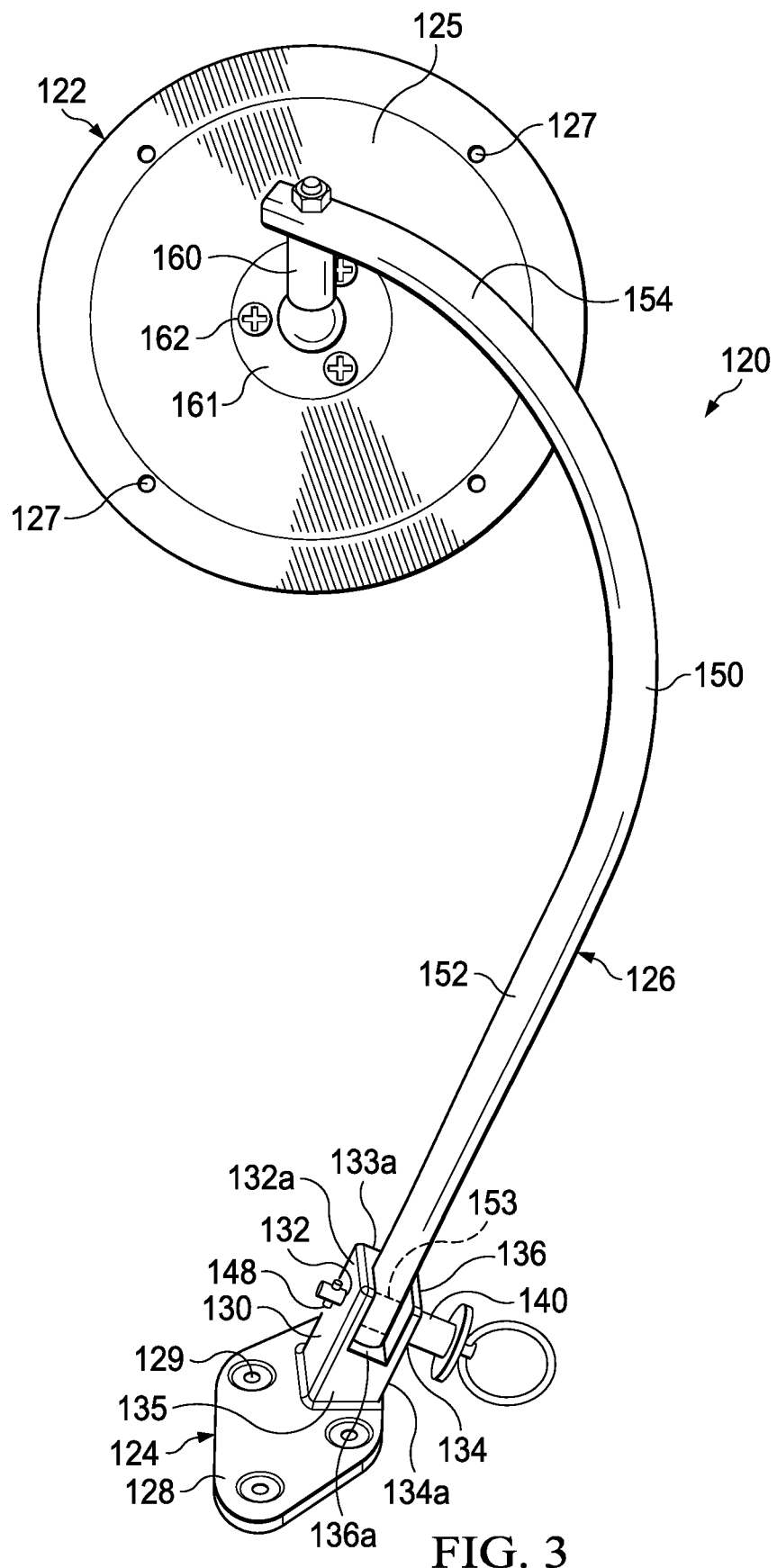
FIG. 3 is a front perspective view of the detachable cargo mirror assembly in a first locked position, according to one example embodiment.

According to FIGS. 1-3, the helicopter 100 includes a central main body as fuselage 102. The fuselage 102 extends along the longitudinal axis 20 from a fuselage front end or nose 104 to a fuselage rear end. The fuselage front end or nose 104 points into the forward direction of the aircraft 100. In an embodiment, a cabin is included in the fuselage 102. The fuselage 102 includes a cabin access door 108 and a lateral front surface area 106 between the nose 104 and the cabin access door 108. The fuselage 102 includes a bottom surface 105 and a side surface 107.

Landing gear 112 supports the helicopter 100 when the helicopter 100 is landing and/or when helicopter 100 is at rest on the ground. The landing gear 112 includes a forward leg 112 and an aft leg 114 each connected at one end to a cross member 110 and at an opposite end to the side surface 107 of the fuselage 102.

External cargo hook 116 is integrated in the bottom, surface 105 of the fuselage 102 to facilitate the external attachment of cargo in combination with the helicopter 100. The external cargo hook 116 allows oversized cargo or cargo having unusual external dimensions/configurations to be readily transported by the helicopter 100. While the external cargo hook 116 does enhance the versatility of the helicopter 100, it is important for the pilot to observe the cargo hook 116 and cargo during flight operations. The external cargo hook 116 is remotely controlled by the pilot in the cockpit of the fuselage 102.

A detachable cargo mirror assembly 120 includes a mirror apparatus 122, an elongated arm attached 126 to the mirror apparatus 122, a bracket 124, and a releasable connector 140. The elongated arm 126 is engaged within the bracket 124 via a releasable connector 140 to be in a first or viewing position 170, as shown in FIG. 1. The pilot relies on the cargo mirror apparatus 122 in the viewing position 170 to observe the cargo hook 116 and cargo particularly during loading and jettisoning operations.

It will be appreciated that the contemplated embodiment is configured showing two detachable cargo mirror assemblies 120 and 121 for the viewing the cargo hook 116. In other embodiments, the detachable cargo mirror 120 can be used to view desired images of areas toward the back of the helicopter 100, for example, but not limitation, to view passengers, loading and unloading systems, hoisting mechanisms, or any maneuvering apparatus that would benefit from being viewed by a pilot, co-pilot, or flight crew. Two, three, four or more detachable cargo mirror assemblies could be used to observe the desired viewing area.

A second detachable cargo mirror assembly 121 can be positioned on the opposite side of the fuselage 102 for use by the co-pilot. The second detachable cargo mirror assembly 121 in one embodiment can be a mirror image of the detachable cargo mirror assembly 120, as shown in FIG. 1. In another embodiment, the second detachable cargo mirror assembly 121 is substantially symmetric and can be identical to the detachable cargo assembly 120; therefore, for the sake of efficiency the features will be disclosed only with regard to the detachable cargo mirror assembly 120. However, one of ordinary skill in the art would fully appreciate an understanding of the second detachable cargo mirror 121 based upon the disclosure herein of the detachable cargo mirror 120.

The detachable cargo mirror assembly 120 is designed to allow the mirror apparatus 122 and arm 126 to be removed from the helicopter 100 completely or stowed when the mirror apparatus 122 is not being utilized. Removal or stowage of the mirror apparatus 122 and arm 126 when not in use allows the helicopter 100 to be operated with a cleaner aerodynamic profile, i.e., less profile drag, thereby enhancing the operating efficiency of the helicopter 100, e.g., higher operating flight speeds, lower fuel consumption.

In another embodiment, as shown in FIG. 2, the mirror apparatus 122 and arm 126 are in a second or stowage position 172 on the side surface 107 of the fuselage 102. The stowage position 172 provides a cleaner aerodynamic profile as compared to the viewing position 170 and can be used when there is restricted space in the fuselage 102 that may not accommodate the mirror apparatus 122 and arm 126.

Figure 4:
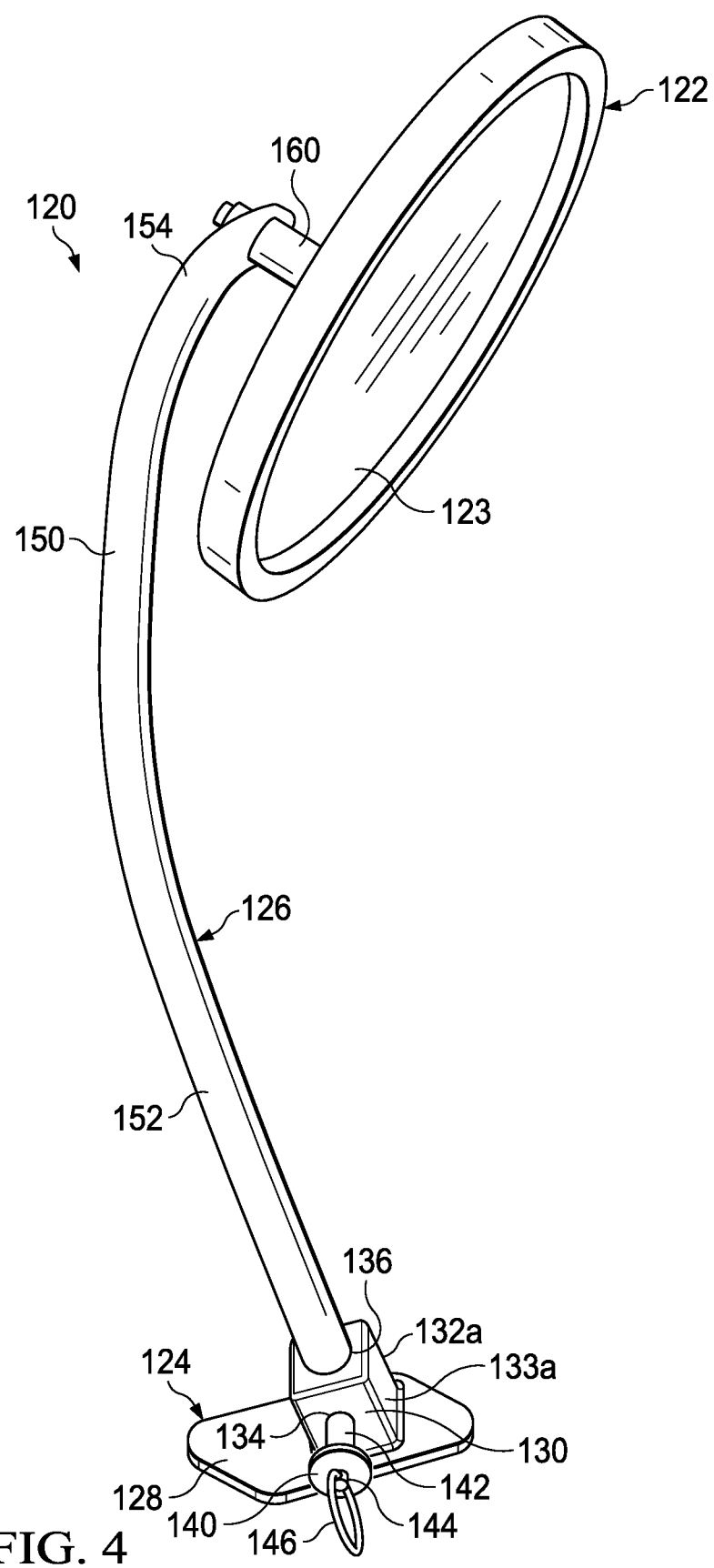
FIG. 4 is a side perspective view of the detachable cargo mirror assembly in a first locked position, according to one example embodiment.

An exemplary detachable cargo mirror assembly 120 is illustrated in FIGS. 3 and 4. The detachable cargo mirror assembly 120 is for use on a rotorcraft surface and includes a bracket 124 configured to mount to the surface on the rotorcraft so as to provide a position suitable for the pilot to view the desired image, e.g., the cargo hook 116. In one embodiment, the surface is an exterior lateral front surface area 106. In another embodiment, the surface is a side surface 107. In yet another embodiment, the surface is a side surface 107. In still another embodiment, the surface is adjacent to the access cabin door 108. In another embodiment, the surface is a bottom surface 105.

In another embodiment, the bracket 124 is adapted for mounting on the landing gear 112. The bracket 124 is configured to attach to the forward leg 112, cross member 110, or both.

It will be appreciated that the bracket 124 can removed from the fuselage 102 surface after use. Any mounting holes remaining in the fuselage 102 surface can be covered with a removable plate.

The bracket 124 includes a base portion 128 and a retainer portion 130 that is generally in the shape of rectangular box having a first pair of opposing holes 132 and 134. The bracket 124 can be constructed of one part that is machined or cast. In another embodiment, the bracket 124 is constructed of multiple parts that are welded or otherwise mechanically or sufficiently secured together.

The base portion 128 is relatively planar and includes a plurality of holes 129 for receiving fasteners for fixedly attaching the bracket 124 to a complimentary surface on the fuselage 102, as shown in FIG. 3. The fastener can be at least one of a conventional rivet, screw, and bolt. In one embodiment, the base portion 128 is adhesively bonded to an exterior surface on the fuselage 102 or landing gear 112.

The retainer portion 130 is generally a rectangular shape including a first pair of opposing holes 132 and 134 each respectively located in a first side wall 132a and a second side wall 134a, a third wall 133a, and a fourth wall 135a. The walls 132a, 133a, 134a, and 135a are connected to the base portion 128 and form a channel 136 for receiving the elongated arm 126 therein. The third wall 133a is transverse to and intersects with the edges of the first and second side walls 132a and 134a. The third wall 133a extends the length of the first and second walls 132a and 134a. The fourth wall 135a is transverse to and intersects with the opposite edges of the first and second side walls 132a and 134a; in the embodiment shown in FIG. 3, the fourth wall 135a extends only partially to provide an access 136a to the channel 136.

In other embodiments, the retainer portion 130 is of sufficient structure to securely receive the elongated arm 126 therein. In one embodiment, the retainer portion 130 is made of one piece that is machined to provide the channel 136 and a first pair of opposing holes 132 and 134. The first pair of opposing holes 132 and 134 are used to receive the releasable connector 140 therein to secure the elongated arm 126 when in use for viewing a desired image.

The retainer portion 130 can be generally cubical, triangular, or cylindrical in shape. In another embodiment, the retainer portion 130 can include a pivotal mounting member such that the position of the elongated arm 126 can be adjusted at the bracket 128.

In yet another embodiment, the retainer portion 130 includes only one hole 134 in wall 134a and can include a recess on an inner surface of the opposing wall 132a for receiving an end of the releasable connector 140.

Figure 5:
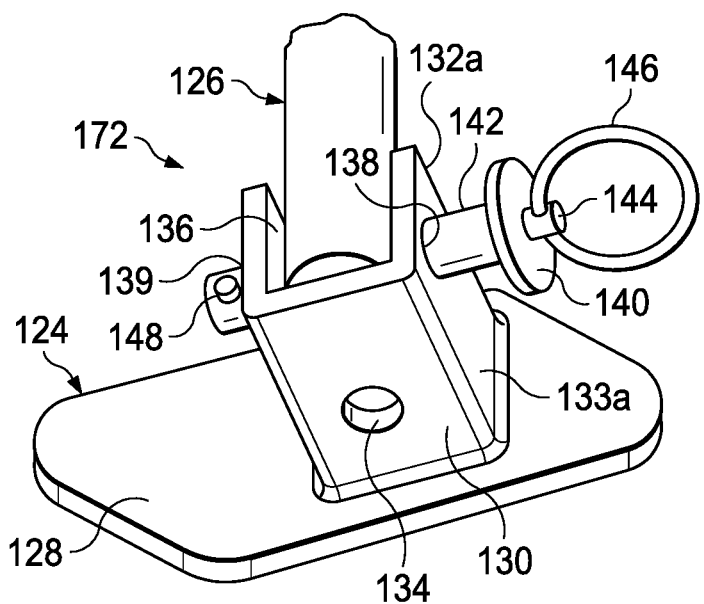
FIG. 5 is a side perspective view of a bracket and arm in a second position for stowage, according to an example embodiment.

In another embodiment, shown in FIG. 5, the retainer portion 130 includes a second pair of opposing holes 138 and 139 which are generally perpendicular in orientation to the first pair of opposing holes 132 and 134. The opposing holes 138 and 139 are located on walls 133a and 135a, respectively, and receives, the releasable connector 140 when in the stowed position 172.

The elongated arm 126 includes two opposing ends, which are a first end 152 for coupling with the bracket 124 and a second end 154 coupled to a mirror apparatus 122. In an embodiment, the elongated arm 126 is a one-piece metal rod. The first end 152 includes a passage 153 for receiving the releasable connector 140. The first end 152 is generally straight and extends longitudinally away from the bracket 124 when engaged therein. The first end 152 leads into a central curved portion 150. The central curved portion 150 leads into the second end 154, which is also slightly curved. The elongated arm 126 is rigidly curved in the central curved portion 150 and the second end 154 sufficient to provide a view of the desired image, which is typically an image of the cargo hook 116 and cargo viewed along the belly edge or side surface 107 of the helicopter 100. The curve in the central curved portion 150 and second end 154 can be modified to permit viewing of a desired image for a particular model and style of an, aircraft.

One embodiment provides an elongated arm 126 with a bifurcated end. The bifurcated end includes two arms each having a mirror apparatus mounted thereon. The two arms extend and are curved sufficiently so each mirror apparatus attached thereon can view a desired image.

The second end 154 is coupled to the mirror apparatus 122 via a connecting arm 160, a pivot mount 161, and plate 162. In one embodiment, the arm 160 and the pivot mount 161 are a ball stud. The pivot mount 161 is secured to a support member 125 of the mirror apparatus 122 by screws received in a plate 162. The pivot mount 161 can be moved into position to view the imaged desired by the pilot prior to take-off and is sufficiently tight so that movement of the mirror apparatus 122 is hampered under flight conditions. In one embodiment, the mirror apparatus 122 is positioned on the pivot mount 161 such that the its center of mass is at the pivot mount 161.

The mirror apparatus 122 is rigid and includes a reflective surface 123. The reflective surface 123 can be sealed to the support member 125 by a rubber gasket along the outer diameter of the reflective surface 123. The support member 125 includes a back surface having a plurality of holes 127 for venting air and moisture. In one embodiment, the reflective surface 123 is a conventional mirror having a piece of transparent material with a reflective coating that can display the mirror image of a desired image.

In another embodiment, the reflective surface 123 is a mirror image of a real world image displayed on cathode Ray Tubes (CRTs), Liquid Crystal Displays (LCDs), Plasma Display Panels (PDPs), Organic Light Emitting Diodes (OLEDs), or other electronic display device. The reflective surface 123 receives an image transmitted from a camera positioned on the mirror support 122 to view a desired image. The camera and reflective surface 123 can be battery powered so as not to require an electrical connection to the helicopter.

The releasable connector 140 is configured to engage with the first pair of holes 132 and 134 and the passage 153 in the elongated arm 126 when the elongated arm is in a first position 170 so the mirror assembly 122 displays the desired image. The releasable connector uses clamping or frictional force to keep the releasable connector 140 in the first position. The releasable connector includes a control member 146, a detent mechanism 142 that moves radially subject to the force exerted on the control member 146 within a pin 142, and a protrusion 148 that extends beyond at least the outer diameter of the second hole 132. In one embodiment, the releasable connector 140 is a detent pin. In another embodiment, the releasable connector 140 is a locking pin, cotter pin, expandable pin, or other mechanical or frictional engaging fastener suitable for securing the elongated arm within 126 the bracket 124.

In one embodiment, the locking method for the detachable cargo mirror assembly includes engaging the first end 152 of the elongated arm 126 in the retainer portion 130 of the bracket 124, aligning the first pair of opposing holes 132 and 134 with the passage 153 in the elongated arm 126, engaging the releasable connector 140 in the first pair of opposing holes 132 and 134 and the passage 153 in the first end 152 of the elongated arm 126, and maintaining the locked configuration 170 by use of a protrusion 148 proximate one of the first pair of opposing holes 132 and 134, wherein the protrusion 153 extends beyond the diameter of one of the first pair of opposing holes 132 and 134. To achieve the locked configuration the pin 142 is engaged and the detent mechanism 142 exerts a spring-loaded force on the protrusion 153 so it projects outwardly when engaged.

To unlock the detachable cargo mirror assembly 120 the method involves releasing the protrusion 148 such that it does not extend beyond the diameter of one of the first pair of opposing holes 132 and 134, disengaging the releasable connector 140 from the first pair of opposing holes 132 and 134 and the passage 153 in the first end 152 of the elongated arm 126, and disengaging the first end 152 of the elongated arm 126 in the retainer portion 130 of the bracket 124. To unlock the locked configuration, the control member 146 is pulled and the detent mechanism 142 spring is compressed such that the spring loaded force on the protrusion 153 is reduced and the protrusion retreats inwardly toward the pin to achieve an outer diameter less than the outer diameter of at least one of the first pair of opposing holes 132 and 134.

Figure 6:
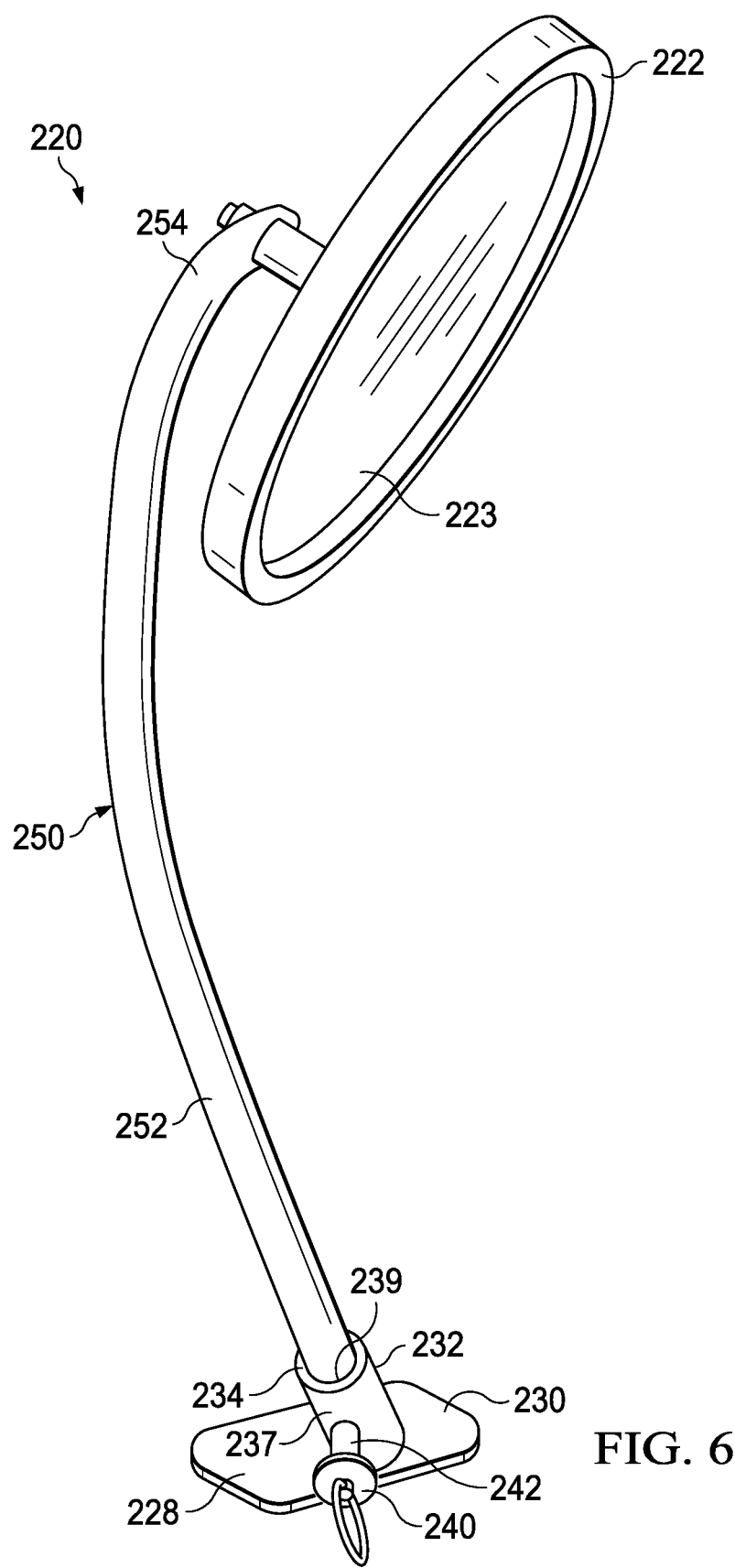
FIG. 6 is a side perspective view of the detachable cargo mirror assembly in a first locked position, according to one example embodiment.

FIG. 6 is still another example of the detachable cargo mirror assembly 120. Certain components of the detachable cargo mirror assembly 120 are as described above and bear similar reference characters, but with a leading '2' rather than a leading '1'. The retainer portion 230 is generally cylindrical in shape and provides a channel 239 for receiving the elongated arm 226 therein. The retainer portion 230 has diametrically opposing holes 234 and 232 for receiving the releasable connector 240 therein.

An illustrative embodiment of the detachable cargo mirror assembly described herein can advantageously provide a detachable cargo mirror assembly such that a portion of the assembly is detached from the bracket and removed or stowed when not in use, which allows the helicopter to be operated with a cleaner aerodynamic configuration and reduces helicopter operating costs.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A detachable cargo mirror assembly for use on a rotorcraft surface, comprising:
   a bracket mounted to a bottom surface on the rotorcraft, the bracket comprising a base portion and a retainer portion having a first pair of opposing holes, the retainer portion having the first pair of opposing holes comprises a first side wall, a second wall, a third side wall, and a fourth side wall; each of the first side wall, the second side wall, the third side wall, and the fourth side wall are connected to the base portion and define a channel, the fourth wall extends only partially to define the channel to provide access thereto;
   an elongated arm having two opposing ends, a first end for coupling in the channel of the bracket and a second end coupled to a mirror apparatus, the first end having a passage; and
   a releasable connector that engages with the first pair of opposing holes and the passage in the elongated arm when the elongated arm is in a first position to display a desired image on the mirror apparatus;
   wherein the elongated arm is fixedly connected to the bracket.

2. A detachable cargo mirror assembly for use on a rotorcraft surface, comprising a kit having:
   a bracket for mounting to a surface on the rotorcraft, the bracket comprising a base portion and a retainer portion having a first pair of opposing holes, the surface of on the rotorcraft having mounting holes;
   an elongated arm having two opposing ends, a first end for coupling with the bracket and a second end coupled to a mirror apparatus, the first end having a passage;

a releasable connector that engages with the first pair of opposing holes and the passage in the elongated arm when the elongated arm is in a first position to display a desired image on the mirror apparatus; and a removable plate configured to cover the mounting holes on the surface of the rotorcraft;

wherein the elongated arm is fixedly connected to the bracket when in the first position during use.

3. A rotorcraft, comprising:

a fuselage with a bottom surface;

a bracket mounted to the bottom surface, the bracket comprising a base portion and a retainer portion having a first pair of opposing holes, the retainer portion having the first pair of opposing holes comprises a first side wall, a second wall, a third side wall, and a fourth side wall; each of the first side wall, the second side wall, the third side wall, and the fourth side wall are connected to the base portion and define a channel, the fourth wall extends only partially to define the channel to provide access thereto;

an elongated arm having two opposing ends, a first end for coupling in the channel of the bracket and a second end coupled to a mirror apparatus, the first end having a passage; and a releasable connector that engages with the first pair of opposing holes and the passage in the elongated arm when the elongated arm is in a first position to display a desired image on the mirror apparatus;

wherein the elongated arm is fixedly connected to the bracket when in the first position.

4. A locking method for the detachable cargo mirror assembly in claim 1, comprising the steps of: engaging the first end of the elongated arm in the channel of the bracket;

aligning the first pair of opposing holes with the passage in the elongated arm;

engaging the releasable connector in the first pair of opposing holes and the passage in the first end of the elongated arm; and maintaining a locked configuration by use of a protrusion proximate one of the first pair of opposing holes; wherein the protrusion extends beyond a diameter of one of the first pair of opposing holes.

5. An unlocking method for the detachable cargo mirror in claim 4, comprising the steps of:

releasing the protrusion such that the protrusion does not extend beyond the diameter of one of the first pair of opposing holes;

disengaging the releasable connector from the first pair of opposing holes and the passage in the first end of the elongated arm; and disengaging the first end of the elongated arm in the channel of the bracket.

6. The detachable cargo mirror assembly of claim 1, wherein the first wall and the second wall each include one of the holes in the first pair of opposing holes.

7. The detachable cargo mirror assembly of claim 6, wherein the third wall is transverse to and intersects the edges of the first wall and the second wall, the fourth wall is transverse to and intersects the opposite edges of the first wall and the second wall.

* * * * *